United States Patent [19]
Gilbert

[11] Patent Number: 5,618,240
[45] Date of Patent: Apr. 8, 1997

[54] SPROCKET RATIO CHANGER

[76] Inventor: Raymond D. Gilbert, 6501 Inwood Dr., Springfield, Va. 22150

[21] Appl. No.: 483,895

[22] Filed: Jun. 7, 1995

[51] Int. Cl.⁶ .................................................. F16H 59/00
[52] U.S. Cl. ................................................ 474/50; 474/69
[58] Field of Search ................................. 474/69, 78–80, 474/50

[56] References Cited

U.S. PATENT DOCUMENTS

| | | | |
|---|---|---|---|
| 3,487,706 | 1/1970 | Resener | 74/243 |
| 3,828,621 | 8/1974 | Uchino | 74/243 PC |
| 4,099,737 | 7/1978 | Waugh | 474/149 X |
| 4,201,094 | 5/1980 | Rathmell | 74/217 B |
| 4,598,920 | 7/1986 | Dutil et al. | 474/50 X |
| 4,599,079 | 7/1986 | Chappell | 474/80 |
| 4,630,839 | 12/1986 | Seol | 280/255 |
| 5,013,285 | 5/1991 | Carlyle | 474/80 |
| 5,035,678 | 7/1991 | Hageman | 474/50 |
| 5,152,720 | 10/1992 | Browning et al. | 474/80 |
| 5,279,524 | 1/1994 | Hilber | 474/69 |
| 5,407,396 | 4/1995 | Gilbert | 474/80 |

*Primary Examiner*—Roger J. Schoeppel

[57] ABSTRACT

A chain shifting apparatus senses bias of pre-set peak pedal force to incrementally move a derailleur cable in a first direction, and to store spring energy. A governor apparatus senses peak cadence to move the cable in a second direction. A cam action from a pedalled-sprocket communicates a timing instant for shifting under low chain transmitting force. A derailleur cable motion distributor communicates single cable up-shift and down-shift instruction from a finger shift and from spring-loaded automatic collet actions to route chains onto available front or rear sprocket sets.

18 Claims, 6 Drawing Sheets

Fig 5.
Fig 6.
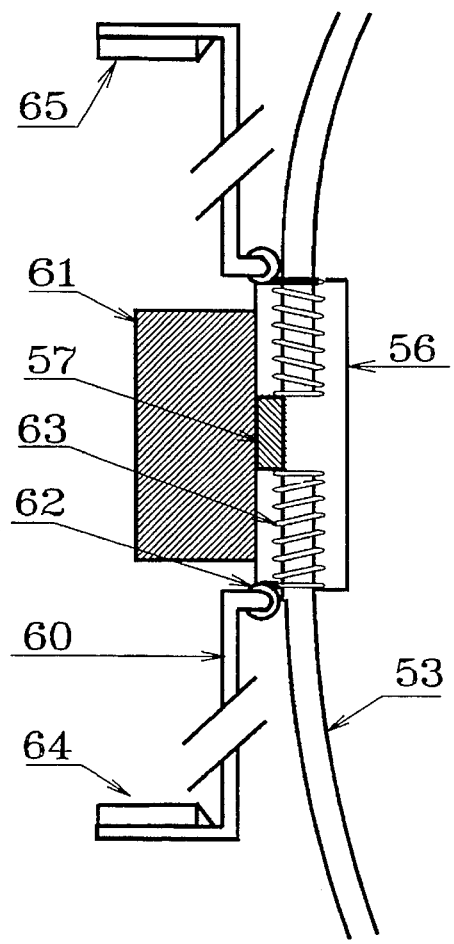
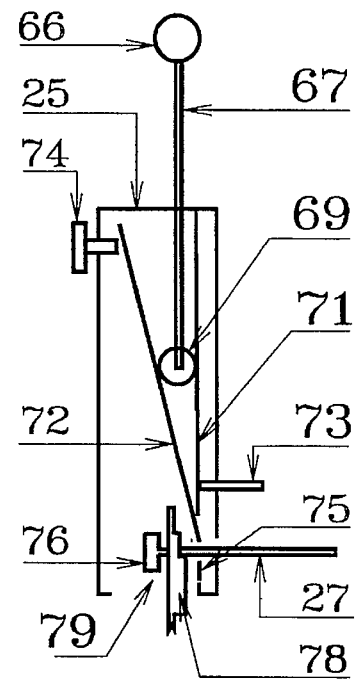
Fig 7.
Fig 8.
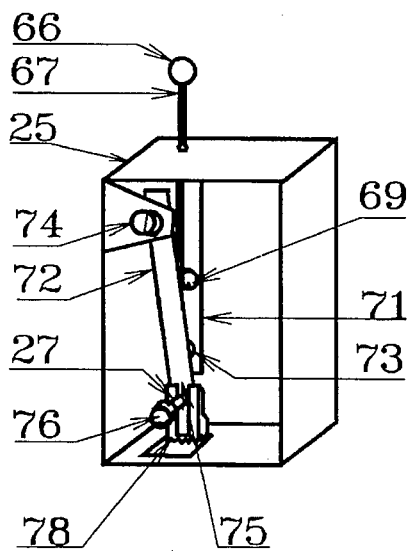
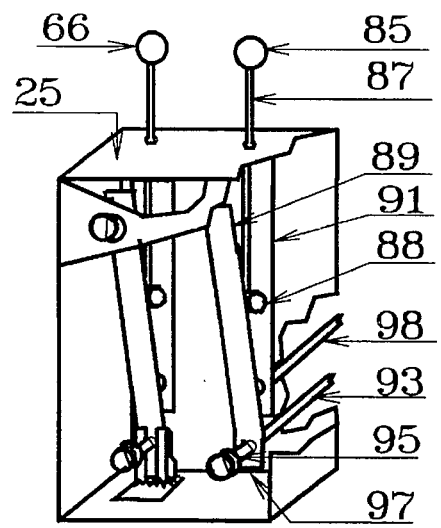

SPROCKET RATIO CHANGER

Cross-References to Related Applications: U.S. Pat. No. 5,407,396 (from Ser. No. 08/181,294), and Docket R395 of 28 Mar. 1995 "Derailleur Cable Collet"

Statement as to rights to inventions made under Federally-sponsored research and development: None

BACKGROUND OF THE INVENTION

1. Field of the Invention

This invention relates to bicycle chain shifting apparatus in which derailleur chain guides are positioned by cable movement. The invention moves derailleur cables to comply with rider-selected pedal pressure and pedal-cadence rate.

2. Description of Related Art

Automatic shifting a derailleur-equipped bicycle involves these problems:

1. Manually shifting a derailleur system demands a greater level of expertise and technique than many riders are willing to develop. However, completely automatic chain shifters also limit the utility of bicycles so equipped.
2. Imperfect timing of a chain shifting event may occur while the chain is at high stress, causing unnecessary mechanical wear to the chain and sprockets, and inducing an unnecessary loss-of-balance risk for a rider.
3. Transferring optimum power from a rider to the bicycle pedal system requires multiple attention of the rider to pedal force and pedal-rate cadence while steering and balancing the vehicle.

An automatic bicycle transmission (U.S. Pat. No. 4,598,920) sensed the angular velocity of a rear bicycle wheel and guided a pedalled chain onto a smaller driven sprocket as angular velocity increased, or larger driven sprocket as angular velocity decreased.

A "Chain Shifter" (U.S. Pat. No. 5,407,396), cited as a reference, automatically adjusts cable movement in response to pedal pressure peaks and low force patterns.

A "Derailleur Cable Collet" of Docket R395 automatically adjusts cable movement in response to pedal pressure and pedal velocity whose threshold presets may be electrically overridden by transducer inputs through other decision logic apparatus.

SUMMARY OF THE INVENTION

This sprocket ratio changer is a bicycle shifting apparatus using mechanically stored energy to grasp and move a derailleur cable.

A biased beam senses pedal pressure and collects pedal work from a draw-chain for storage in a spring. Movement of the biased beam communicates changing levels of draw-chain pressure during a pedalling cycle. A trigger plate senses movement beyond a threshold position, and releases a sear of the compressed spring module to move a collet that grips and moves a derailleur cable.

Communication from the trigger may pass through a pedal-position sensor to time release of the spring energy into the collet.

A speed sensor communicates with a ring on a pedalled sprocket to measure cadence rate. The sensor output moves a velocity rod that presses against a pre-set velocity-threshold trigger plate position. The spring-held energy collection, storage, and release for cadence shifting actuate and oppositely-directed cable movement apparatus to provide automatic derailleur changing functions for pedal cadence similar to those for pedal pressure.

Advantages of the invention over prior art include

1. A rider may let the automatic shifting feature operate or may use manual shifting capability.
2. Timing of a high-tension chain shift is automatically coordinated with the minimum chain force of a rider's pedal-stroke. Equipment wear and rider risk are reduced.
3. Rider attention need not be distracted by needs to manually direct derailleur to shift chain among sprocket options.

| | |
|---|---|
| 1. draw-chain | 13. second tension path |
| 3. pedalled sprocket | 15. third tension path |
| 5. pedal | 17. beam |
| 7. chain loop | 19. frame |
| 9. wheel-driving sprocket | 21. biasing spring |
| 11. Third wheel | |

Figure 3:
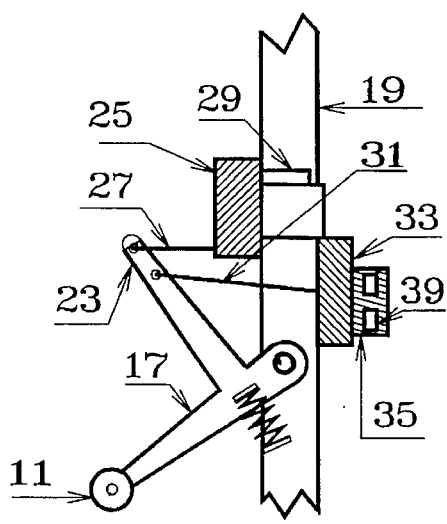

FIG. 3. Bias Beam with Measuring and Collecting Members

| | |
|---|---|
| 23. measuring point | 31. collector bar |
| 25. threshold box | 33. spring and latch module |
| 27. measuring rod | 35. cable moving module |
| | 39. collet |

Figure 4:
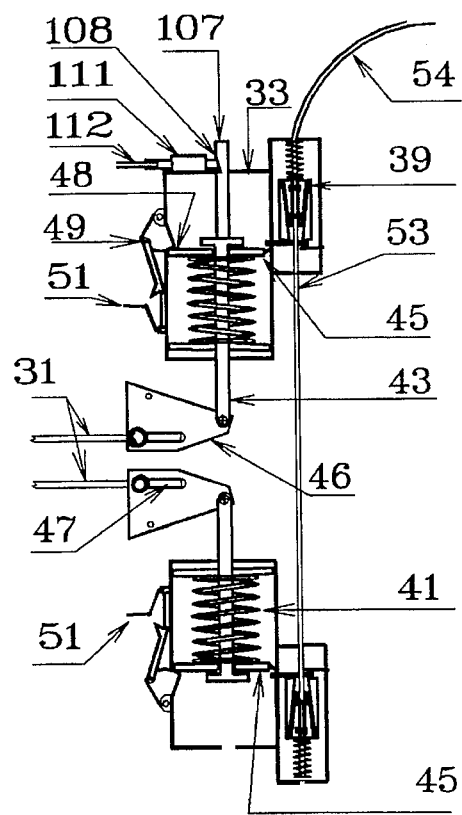

FIG. 4. Spring and Latch Module

| | |
|---|---|
| 41. Storage Spring | 51. First Seap Apparatus |
| 43. Spring Loading rod | 53. Derailleur Cable Core |
| 45. Collet Drawbar | 54. Derailleur Cable Cover |
| 46. Rocker Arm | 107. Second Sear Shaft |
| 47. Slot Bearing | 108. Sear Shaft Notch w Face |
| 48. Travel Limit Point | 111. Timed Sear Latch w Face |
| 49. First Latch Pawl | 112. Timed Sear Rod |

FIG. 5. Draw-Spring Collet Module

| | |
|---|---|
| 56. Collet Box | 62. Pulling Loop |
| 57. Compression Block | 63. Draw Spring |
| 60. Draw Bar Extensions | 64. Down-Shift Module |
| 61. Frame Connection | 65. Up-Shift Module |

FIG. 6. Pedal Force Threshold Apparatus

| | |
|---|---|
| 66. Force-Setter Ball-handle | 73. Trigger rod |
| 67. Setter shaft | 75. Forked beam end |
| 69. Roller Fulcrum | 76. Measuring rod block |
| 71. Threshold Trigger Plate | 77. Front Derailleur lever |
| 72. Force-Ratio Beam | 78. Compensator Fork |

FIG. 7. Threshold Box with Pedal Force Apparatus

74. Adjusting Screw

FIG. 8. Threshold Box with Cadence Apparatus

| | |
|---|---|
| 85. Cadence Setter Ball | 91. Cadence Trigger Plate |
| 87. Cadence Shaft | 93. Velocity rod |
| 88. Cadence Roller Fulcrum | 95. Velocity rod block |
| 89. Cadence Ratio Beam | 97. Bottom of Ratio Beam |
| | 98. Cadence trigger Rod |

Figure 9:
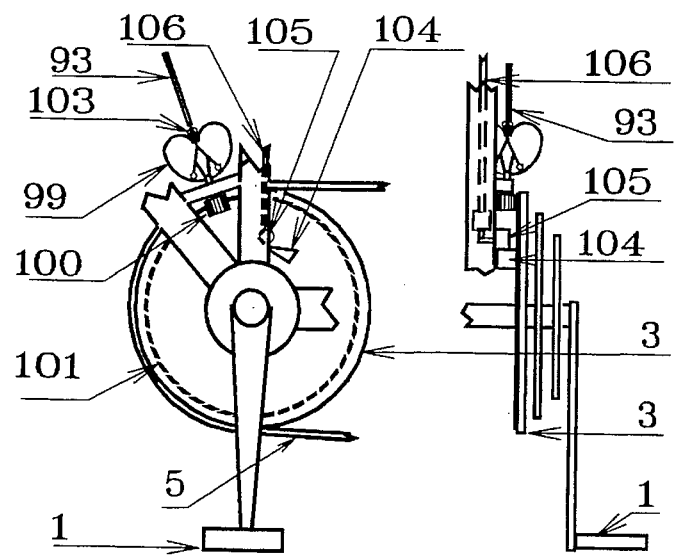

FIG. 9. Pedalled Governor and Timing Sear

| | |
|---|---|
| 93. Velocity Rod | 104. Sear Timing Cam |
| 99. Encased Governor | 105. Timing Roller |
| 100. Gear | 106. Sear Timing Rod |
| 101. Tooth ring | 109. A Frame-Mounted |

-continued

|  |  |
|---|---|
|  | Bearing |
| 103. Velocity Rod Holder |  |

Figure 10:
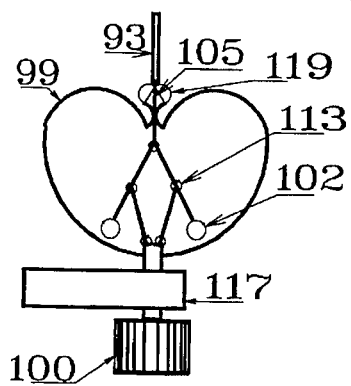

FIG. 10. Contained Flyball Governor

| 102. Flyball Action | 117. Flyball Bearing |
| 113. Bearing and Bracket | 119. Flexible Seal |

Figure 11:
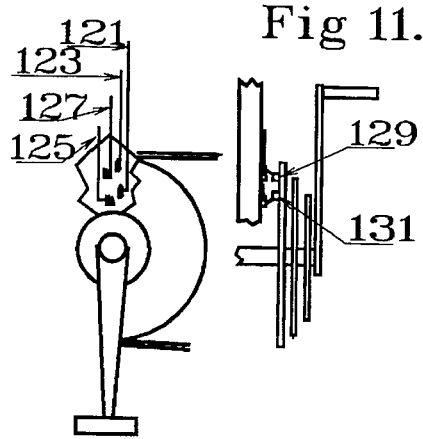

FIG. 11. Sear Delay Communication and Toggles

| 121. Trigger Rod, Force | 127. Trigger Rod, Cadence |
| 123. Sear Delay Rod, Force | 129. Toggle switch, Force |
| 125. Sear Delay Rod, Cadence | 131. Toggle switch, Cadence |

Figure 12:
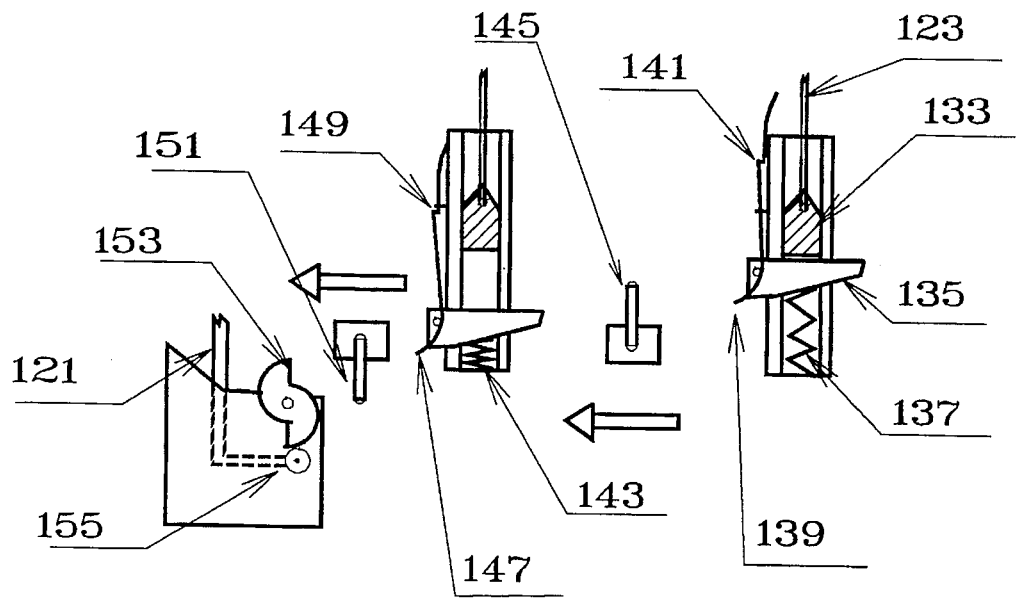

FIG. 12. Toggle Cam Sequence

| 121. Frame-Sliding Rod | 143. Cam Spring, Compressed |
| 133. Toggle-Cam | 145. Toggle at First Position |
| 135. First Cam Face | 147. Holding Spring Release |
| 137. Cam Return Spring | 149. Holding Spring Hook |
| 139. Cam Holding Spring | 151. Toggle at Second Position |
| 141. Channel | 153. Rotary Cam |
| 142. Toggle Cam Module | 155. Cam Follower |
|  | 156. Toggle-return cam |

Figure 13:
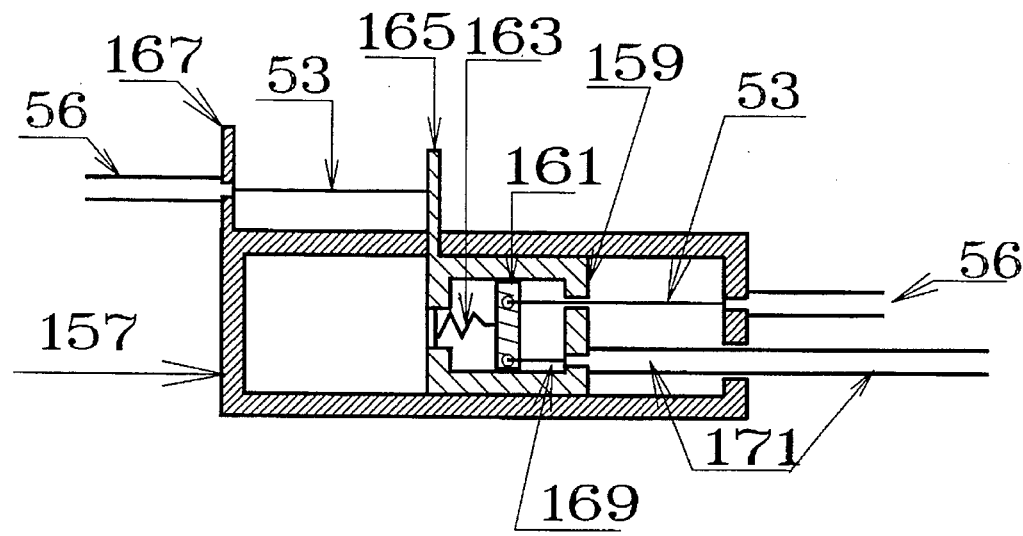

FIG. 13. Cable Motion Distributor

| 53. First Derailleur Cable Core | 161. A Core Slider |
| 56. First Derailleur Cable Cover | 163. A Centering Spring |
| 157. A Distributor | 165. A Carrier Box Arm |
| 158. An outer wall | 167. A Distributor Box Arm |
| 159. A Carrier Box | 169. A Second Cable Core |
|  | 171. A Second Cable Cover |

Figure 14:
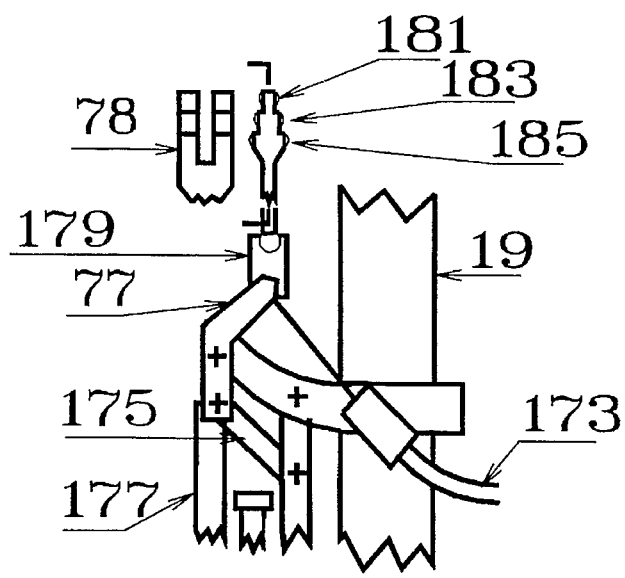

FIG. 14. Front Derailleur Lever with Compensator Fork

| 19. Frame | 177. Chain Guide |
| 77. Front Derailleur Lever | 179. Hinge Connection |
| 78. Compensator Fork | 181. First Spacer Lobe |
| 173. Second Cable | 183. Second Spacer Lobe |
| 175. Parallel Diagonal | 185. Third Spacer Lobe |

Figure 15:
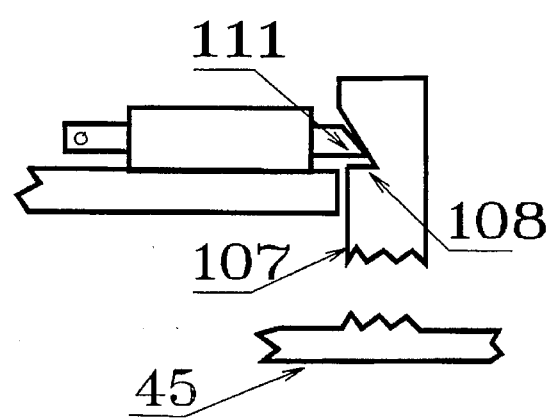

FIG. 15. Second Sear Notch Face and Latch

| 107. Second Sear Shaft | 110. Shift Timing Latch Mount |
| 108. Sear Shaft Notch w Face | 111. Timed Sear Latch w Face |

Figure 16:
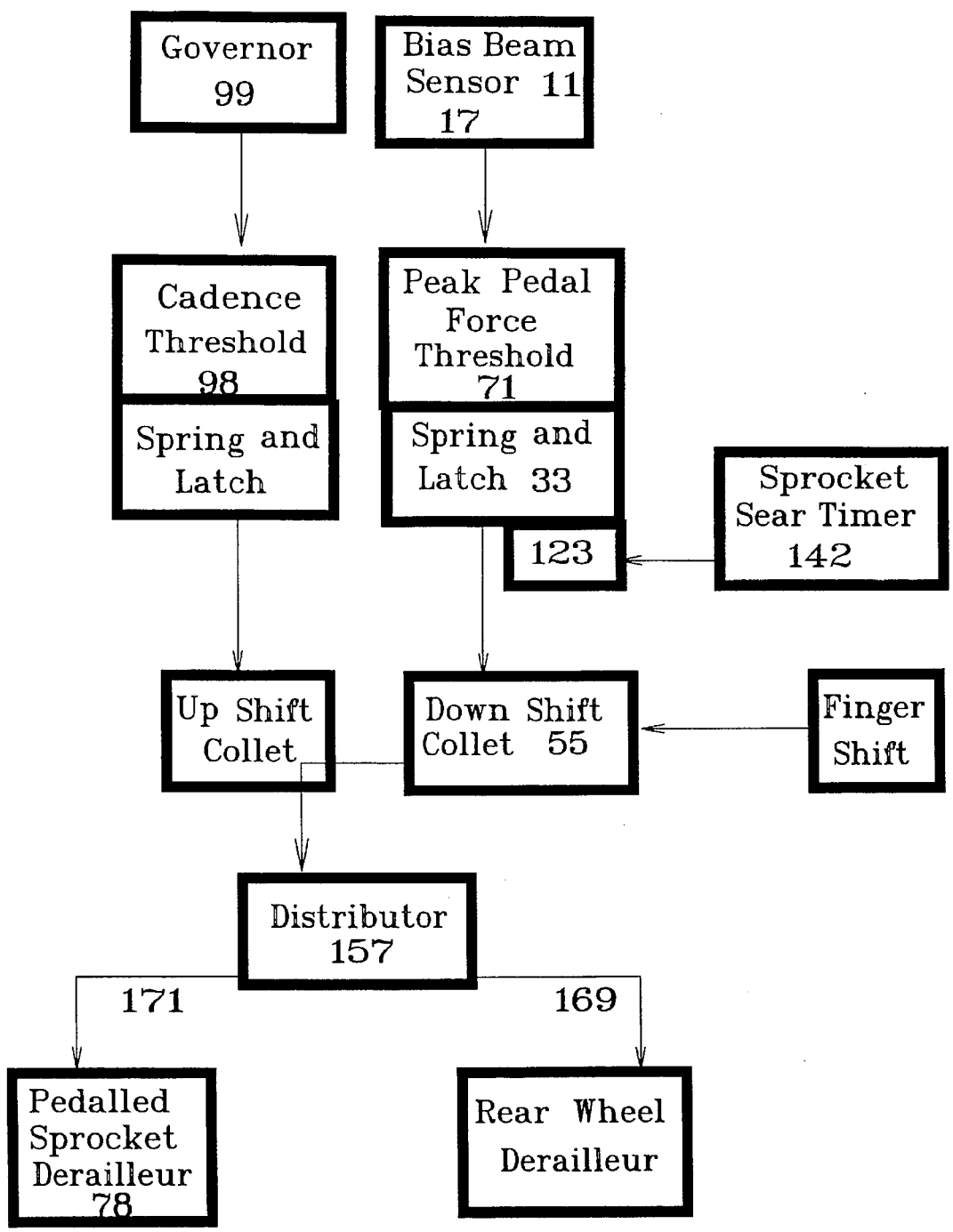

FIG. 16. Module Communication

| 11. Third wheel | 99. Encased Governor |
| 17. Biased beam | 98. Cadence trigger |
| 33. Spring & Latch modules | 123. Sear delay |
| 64. Downshift collet module | 142. Toggle cam module |
| 65. Upshift collet module | 157. Distributor |
| 71. Threshold trigger plate | 169. Cable to rear derailleur |
| 78. Compensator fork | 171. Cable to front derailleur |

DESCRIPTION OF THE PREFERRED EMBODIMENTS

A sprocket ratio-changer measures biased deflection of a draw chain (FIG. 2-1) and cadence of a pedalled sprocket (FIG. 2-3) from the instant force and velocity of a rider's pedal (FIG. 2-5).

The pedalled sprocket converts a rider's pedal force into chain tension communicated by the draw-chain portion of a total chain loop (FIG. 2-7). A first tension path of the draw-chain passes from a wheel-driving sprocket (FIG. 2-9) to the pedalled sprocket.

A third-wheel (FIG. 2-11), such as a pulley or sprocket, is biasly pressed against the draw-chain to alter its first tension path into a combination second tension path (FIG. 2-13) and a third tension path (FIG. 2-15).

The third wheel is mounted on a first end of a beam (FIG. 2-17) whose second end rotates on a first end bearing connected to the frame (FIG. 2-19). A biasing spring (FIG. 2-21) is connected to the beam and to the frame and provides a bias force to angular movement of the beam.

An surface area of the beam is extended perpendicularly to provide an area on which a measuring point (FIG. 3-23) is perpendicular to threshold box (FIG. 3-25) and the point locates a bearing for a first end of a measuring rod (FIG. 3-27) that communicates with a pedal force threshold apparatus (FIG. 6) within the threshold box (FIG. 7).

The operation of this draw-chain biasing means presses the biased third wheel against a point on the first path of the draw chain to generate a second path from the wheel-driving sprocket to a third path to the pedalled sprocket.

An energy collector bar (FIG. 3-31) communicates oscillating motion from a bearing point on the beam to a spring and latch module (FIG. 3-33) which contains apparatus for mechanical storage of energy.

Note. A pedalled vehicle typically receives a non-uniform driving-force pattern into the pedals. A resultant variation in stress within the draw-chain reacts against the biased beam to generate an oscillation. Work from the movement of a force provides energy for storage and for subsequent movement of derailleur cables.

The energy storage modules communicate with a cable moving module (FIG. 3-35) that contain collets (FIG. 4-39) which convert spring driven motion into cable motion.

A preferred energy collector is the spring and latch module (FIG. 4) holding a storage spring (FIG. 4-41). A spring loading rod (FIG. 4-43) connects a collet drawbar (FIG. 4-45) at the base of the spring, through the center of the spring to a rocker arm (FIG. 4-46) that includes a slot bearing (FIG. 4-47) which hosts one end of the energy collector bar (FIG. 4-31).

The collecting bar draws the collet drawbar against the spring and past a travel limit point (FIG. 4-48) where a first latch-pawl (FIG. 4-49) biasly slides behind the drawbar to hold the spring compression. Without the spring reaction, the end of the collecting bar oscillates within the slot bearing.

A first sear apparatus (FIG. 4-51) draws the first latch pawl from the path of the collect draw-bar to release the spring driven draw bar. Draw bar movement compresses the collet (FIG. 4-39) around the derailleur cable core (FIG. 4-53) and moves it through its cable cover (FIG. 4-54) by one increment.

A preferred draw-spring collet module (FIG. 5) contains, in a collet box (FIG. 5-56), a compression block (FIG. 5-57), cable-guide fittings (FIG. 5-58), cable pulling assemblies (FIG. 5-59), draw-bar extensions (FIG. 5-60), and frame connection (FIG. 5-61).

The draw bar extension connects the collet draw-bar (FIG. 5-45) of the spring and latch module (FIG. 4-33) to a pulling loop (FIG. 5-62) of a draw spring (FIG. 5-63) through which the derailleur cable core (FIG. 5-53) passes.

The collet draw-bar of the spring module rigidly connects to the draw bar extension, permitting the storage spring travel limit point (FIG. 4-48) to influence static compression of the draw springs:

Storage springs that are held in compression communicate through the draw bar extensions a fixed dimension for two draw springs and a compression block. This dimension holds each draw springs in slight compression.

End-to-end compression of a draw springs with large pitch expands the spring's inside diameter. Without compression the draw springs inside diameter is approximately equal to the outside diameter of the cable core, offering a "sliding fit" of small, but measurable resistance. When drawn in tension, the large pitch is extended against the resistance to draw a tight grip on the cable core.

When a sear action releases the drawbar, the storage spring grips the cable and communicates an increment of linear motion.

Recocking the spring and latch module reinvests a compression in the spring that makes cable motion free.

The pedal force threshold box (FIG. 3-25) faces an oscillating movement plane of the bias beam (FIG. 2-17) and receives its communication through the measuring rod (FIG. 3-27).

A force-setter ball-handle (FIG. 6-66) and setter shaft (FIG. 6-67) provide motion through the top of the threshold box to enter pedal force shifting point values.

The shaft connects to a roller-fulcrum (FIG. 6-69) which moves between a cantilever-suspended elastic threshold trigger plate (FIG. 6-71) and a force-ratio beam (FIG. 6-72). A trigger rod (FIG. 6-73) extends perpendicularly from a free end of the trigger plate, and passes through the box's vertical wall and connects to the sear apparatus (FIG. 4-51) of the spring and latch module.

The ratio beam is connected to one side of the box near its top by an adjusting screw (FIG. 6-74). A forked bottom end (FIG. 6-75) of the force-ratio beam straddles the measuring rod and communicates with a rod block (FIG. 6-76) of the measuring rod.

A front derailleur lever (FIG. 14-77) communicates a vertical position change for a compensation fork (FIG. 6-78) to occur concurrently with adjustment of horizontal position of front chain guides. The fork is hinged to the lever and extends into the threshold box to oscillate with the measuring rod block. The lever lifts and lowers the compensator to match a thickness spacer between the measuring rod block and the ratio beam that is proportional to the change in pedal force for each front sprocket (FIG. 2-9) over which the chain travels.

A cadence setter ball (FIG. 8-85) and shaft (FIG. 8-87) extend into a second portion of the threshold box (FIG. 7) to adjust a cadence roller fulcrum (FIG. 8-88) between a cadence ratio beam (FIG. 8-89) and a cadence trigger plate (FIG. 8-91). A velocity rod (FIG. 8-93), communicates governor output position to the velocity threshold apparatus.

When the velocity rod block (FIG. 8-95) contacts a bottom fork (FIG. 8-97) of the ratio beam with sufficient force, the biased cantilevered trigger plate releases its stored energy into a cadence trigger rod (FIG. 8-98) that communicates with a sear apparatus of a second spring and latch module that drives a second draw-spring collet.

Within threshold box (FIG. 8-27) threshold apparatus for pedal force actions "shifts down" the ratio of pedalled revolutions to wheel revolutions to reduce the proportion of wheel turns for each pedalled sprocket revolution. Oppositely, threshold apparatus for cadence actions "shifts up" the ratio of wheel revolutions for each pedalled sprocket revolution.

The velocity rod (FIG. 9-93) communicates to an encased governor (FIG. 9-99), that is driven by a gear (FIG. 9-100) turned by a tooth ring (FIG. 9-101) on the inside surface of a front set of pedalled sprockets. The flyball action (FIG. 10-102) moves a velocity-rod holder (FIG. 10-103).

Bicycle safety is enhanced if chain shifting from one sprocket to another is executed while the chain is transmitting a minimum stress. A parallel logic shift-timing apparatus mounts a sear-timing cam (FIG. 9-104) on an inward-facing surface of the pedalled sprocket, to actuate a timing roller (FIG. 9-105) that communicates a sear timing rod (FIG. 9-106) movement to the spring and latch module (FIG. 4).

A second sear shaft (FIG. 4-107) extends beyond the collet drawbar (FIG. 4-45) and through the end of the module. A sear shaft notch with face (FIG. 15-108) of a second-sear rod is separated by a small distance from the timed sear latch with face (FIG. 15-111). This second sear is attached to the spring and latch module as a frame-mounted bearing (FIG. 9-109).

When a trigger action from within the pedal force threshold apparatus draws the first latch pawl away from the spring's travel, a timed sear latch (FIG. 4-111) stops the spring and collet drawbar (FIG. 4-45) from further travel until the timed sear rod (FIG. 9-112) communicates an instant of time when the pedalled sprocket is at a position of minimum force communication.

A series logic shift timing apparatus, suitable for velocity-paced shifting routes the trigger rod (FIG. 7-73) from the threshold box to a frame-sliding rod (FIG. 11-121), mounted on the frame and connected to a toggle-cam. At the time of threshold triggering, a toggle cam (FIG. 12-133) is depressed and a toggle switch (FIG. 11-129) on the inner face of the pedalled sprocket is moved from toggle, first position [B] (FIG. 12-145) to toggle, at second position [D] (FIG. 12-151) where it actuates a rotary cam (FIG. 12-153) against a cam-follower (FIG. 12-155) to communicate movement through a sear delivery rod to the first position pawl. A cam-holding spring (FIG. 12-139) retains the cam in a toggle moving condition until the toggle's movement releases its holding spring hook (FIG. 12-149). A toggle return cam repositions the toggle arm after it has actuated the rotary cam.

The single derailleur cable core (FIG. 13-53) communicates shifting instruction of the draw spring collet box. A distributor (FIG. 13-157) converts the first cable core (FIG. 13-53) motion into separate derailleur shifting motions of first cable core (FIG. 13-53A) and second cable core (FIG. 13-169):

A first cable cover (FIG. 13-56) terminates at an outer wall (FIG. 13-158) and routes the first core through that distributor wall and through a first wall of a carrier box (FIG. 13-159) to a core slider (FIG. 13-161). The carrier box slides within the distributor and transmits unrestricted first cable core motion through an arm (FIG. 13-165) and continuation of first cable core (FIG. 13-53) motion.

The first cable core connects to a core slider (FIG. 13-161) that slides within the carrier box. The slider is also connected to a second cable core and to an open pitch centering spring (FIG. 13-163), having bias strength in both compression and tension against a carrier box second wall.

Figure 2:
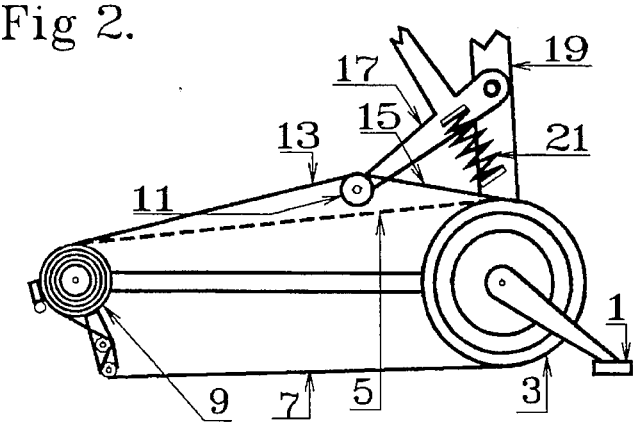
FIG. 2 Draw-chain, with Sprockets and Biased Third Wheel

A second cable cover (FIG. 13-171) connects directly to the first wall of the carrier box, and travels without restriction through a hole in the distributor case and on to a derailleur for the pedalled sprocket (FIG. 2-3).

When a cable-core moving instruction from the collets exceeds the travel limits of the rear wheel derailleur, the core slider moves against a bias of the spring to move the cable core of the front derailleur (FIG. 13-169).

The pedalled sprocket (front) derailleur (FIG. 14) connects to the front cable core (FIG. 14-169). Cable movement draws the front derailleur lever (FIG. 14-77) to move the front chain guide (FIG. 14-177) diagonally. A horizontal vector shifts the chain; and a vertical vector lifts a hinge (FIG. 14-179) and compensator fork (FIG. 14-78) that fits through the bottom of the pedal force threshold box. A first, second or third spacer lobe (FIGS. 14-181, 182 & 183) are positioned between the measuring rod block (FIG. 6-76) and the ratio-beam end (FIG. 6-75) as means to compensate for pedal force-to-chain force ratios that change as the chain is fitted to front sprockets of different diameters.

FIG. 15 shows detail of a second sear shaft (FIG. 15-107) that extends from the collet drawbar (FIG. 15-45). A notch (FIGS. 4-108 & 15-108) in the shaft and a second sear-latch (FIG. 4-111 & 15-111) are mounted (FIG. 15-110) at the base of pedal-force spring and latch set.

Figure 1:
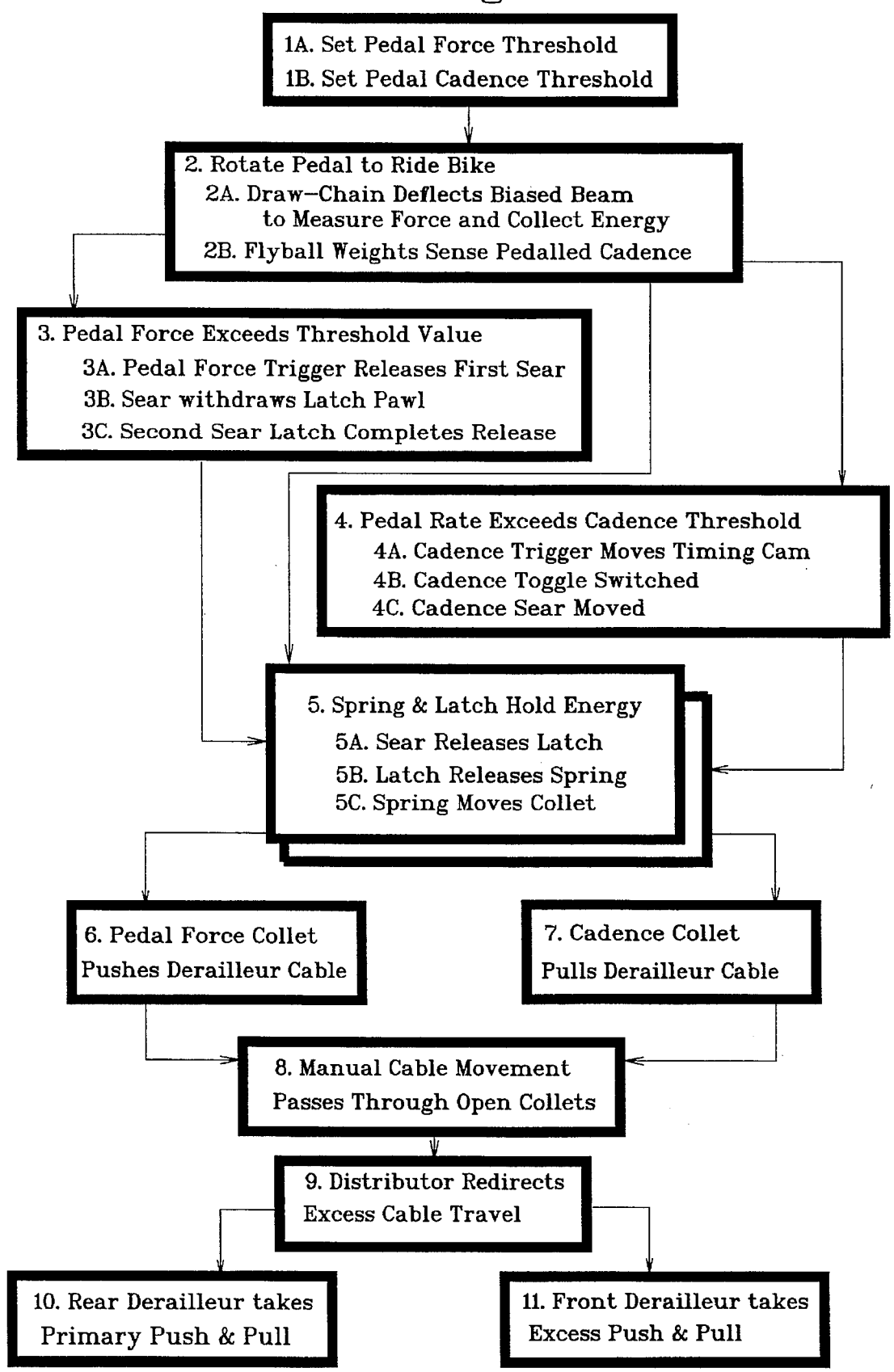
FIG. 1 Diagram of Sprocket-Ratio Changer Method

FIGS. 1 and 16 summarizes communication among modules within the sprocket ratio changer to illustrate a unity in purpose for the subsystems and their components.

I claim:

1. A sprocket ratio changer comprising:

a pedalled sprocket a wheel-driving sprocket a draw-chain a frame, and a draw-chain biasing means further comprising a third wheel means, a beam means, an elastic bias means, and a measuring communication means;

wherein the pedalled sprockets and the wheel-driving sprockets are rotationally connected to the frame; and wherein the draw-chain is a tensioned portion of a continuous chain connecting the wheel-driving sprocket and the pedalled sprocket; and wherein the draw-chain biasing means presses a third wheel against the draw-chain:

wherein the beam means is connected to the frame, to the third wheel means and to the mechanical communication means; and wherein the third wheel means, is a wheel, such as a sprocket, and is mounted to turn freely on a first end of the beam; and wherein the draw chain biasing means communicates third wheel displacement for use in measuring pedal force;

whereby the biased third wheel displaces the draw chain from a first path between sprocket sets to measure pedal force as a function of draw-chain displacement.

2. A sprocket ratio changer of claim 1 wherein the draw-chain biasing means further comprises;

a beam-to-frame bearing, and an elastic bias, and a mechanical communication means, further comprising a measuring rod;

wherein the beam-to-frame bearing is mounted on a second end of the beam, providing a rotational freedom to the frame connection; and wherein the elastic bias is a spring, held between a surface of the beam and a surface of the frame; and wherein the mechanical communications means are bearing connection points on the beam, one of which is connected to an end of the measuring rod; and wherein the biased third wheel displace a path point of the draw-chain.

3. A sprocket ratio changer of claim 2, further comprising:

an energy collection means, further comprising an energy collector bar, an energy storage means, further comprising a spring and latch module, further comprising a module structure a storage spring a first latch apparatus, further comprising a biased pawl and a sear; and a cocking rod means, further comprising a slot bearing a spring-loading rod a collet drawbar an energy release means, further comprising;

a first sear-actuating communication apparatus;

wherein the energy storage and release means are attached to the frame; and wherein the energy collector bar is the mechanical communication between a bearing connection of the beam surface and the slot bearing of the cocking rod means; and wherein a vehicle rider's typical input to a pedalled sprocket delivers a non-uniform chain force which oscillates the beam; and wherein the energy storage means is the storage spring within the spring and latch module; and wherein the spring-loading rod passes through the center of the storage spring and connects to a collet drawbar; and wherein the biased pawl, positioned within the latch module structure, will interrupt a return path of the spring and collet drawbar when the spring loading rod draws the drawbar past a first latch position; and wherein the energy release means is the first sear-actuating communication apparatus which draws the biased pawl from its interrupting path position to release the spring's stored energy.

4. A sprocket ratio changer of claim 3 further comprising:

a downshift cable-core collet means a cable-core path and a drawbar extension;

wherein downshift relates to a change in chain path in which the number of pedalled sprocket turns is increased for the same number of rear wheel turns; and wherein a pedal force-sensing apparatus instructs action to a downshift collet means when pedal forces exceed threshold set values; and wherein the collet means is a mechanism for grasping the cable-core whose path passes through the collet and for communicating movement in an increment of a first direction.

5. A sprocket ratio changer of claim 4, wherein the cable core collet means further comprises:

a draw-spring-collet further comprising;

a collet box, a compression block, the spring module collet drawbar, a draw-spring further comprising a coil spring a spring-end connecting means further comprising a pulling loop; and a derailleur cable assembly, further comprising a cable core, a cable guide, cable guide fittings; and a drawbar extension;

wherein the collet box connects to the frame, connects to derailleur cable guide fittings, and holds the compression block; and wherein the cable core passes through the collet box and through the inside diameter of the draw spring: and wherein the draw spring is a coil spring whose open pitch permits end-to-end compression which increases the inside diameter of the spring; and wherein the inside diameter of the coil spring before compression is greater than the outside diameter of the cable core, and imperfectly round; resulting in a low-friction "sliding fit"; and wherein a working length of the draw spring is less than the length of an unstressed draw spring, thus holding the spring in slight compression against the compression block and maintaining the inside diameter greater than cable core size; and whereby the cable core has freedom of movement while the collet is held at rest; and wherein the spring-end connecting means is a pulling loop, bent to be separated from a path of the cable core; and wherein the pulling loop is attached to the drawbar extension which also communicates with a collet drawbar from within an energy storage module; and wherein a timed energy release of the collet drawbar will draw the coiled "draw-spring" out of its larger diameter compressive length and into a cable-gripping diameter and length;

whereby the cable core is moved one increment in one direction; and wherein a returning drawbar extension will slide the draw spring with low friction in a compressive direction along the cable until contact with the compression block completes its travel to a compressed collet-rest condition.

6. A sprocket ratio changer of claim 4 further comprising:
   an upshift cable-core collet means;
   a cable core path, and
   a drawbar extension;
wherein upshift relates to a change in chain path in which the number of pedalled sprocket turns is decreased for the same number of rear wheel turns; and
wherein the collet means is oriented for grasping a cable-core whose path passes through the collet and for communicating an oppositely-directed movement in an increment of second direction.

7. A sprocket ratio changer of claim 6, further comprising:
   a pedal-force threshold apparatus further comprising:
      a threshold box
      a threshold pedal-force setting means, further comprising;
         a force-setter handle and
         a setter shaft
      a dimension-setting means, further comprising
         a roller fulcrum,
         a trigger plate and
         a ratio beam;
      the pedal-force measuring means, further comprising
         the measuring rod and
         an end block of the measuring rod end
      a trigger communicating means, further comprising
         a trigger rod; and
wherein the threshold setting box is attached to the frame and the measuring rod is connected to the bias beam and to a pedal force threshold apparatus within the box; and
wherein the handle and shaft movingly extend through the top of the box to connect to the roller fulcrum, which in turn, separates the trigger plate and the ratio beam; and
wherein the trigger plate is fixed at a first end to the box, and is biasly free at a second end to move the trigger rod through a side of the box; and wherein a first end of the ratio beam is hingedly connected to the box front, and a second end is slotted to straddle the measuring rod, and to move in response to force communicated by an end of the measuring rod; and
wherein a controllable location of the roller fulcrum sets a dimensional distance between the second end of the bias beam and the free end of the biased trigger plate; and
wherein a trigger rod extends from the base of the trigger plate in an outward communication to a sear apparatus; whereby pedal force from the measuring rod is measured against predetermined threshold settings, and triggers release of stored energy into moving a derailleur cable.

8. A sprocket ratio changer of claim 7, further comprising a front derailleur position compensator further comprising;
   a front derailleur cable lever
   a hinge connection
   a measuring-spacer means, further comprising;
      a first thickness shape,
      a next thickness shape, and
      a rod slot;
wherein the cable lever communicates through a hinge connection with the measuring spacer means; and
wherein the measuring spacer means extends from the derailleur apparatus through a wall of the threshold box; and
wherein the measuring spacer fits between the measuring rod end and the slotted end of the ratio beam;
whereby a change in chain position on the front sprocket set is communicated to the pedal force threshold apparatus as a dimension compensator between the measuring end block and the second end of the ratio beam.

9. A sprocket ratio changer of claim 3, further comprising a parallel sprocket-timed sear release means.

10. A sprocket ratio changer of claim 9 wherein the parallel sprocket-timed release further comprises:
   A second sear, further comprising
      a shift-timing latch mount,
      a second sear shaft,
         a sear shaft notch with face
         a timed sear-latch with face; and
   an inward-facing pedalled sprocket surface further comprising:
      a sear timing cam
      a sear timing roller; and
   a sear timing rod, further comprising;
      a frame-mounted sliding bearing
      a sear timing rod
      a timing roller;
wherein the second shift timing latch mount is attached to the spring and latch assembly; and
wherein the second-sear shaft extends coaxially from the spring-loading rod and center of the collet drawbar to pass the second latch mount; and
wherein the notch of the second sear shaft is open toward the second latch; and
wherein the face of the shaft notch is separated from the face of the latch while the pawl restricts spring-driven movement of the collet drawbar; and
wherein the sear timing cam displaces the sear timing roller and sear timing rod at a predefined point of rotation at each pedal revolution; and
wherein location of the cam on the surface of the pedalled sprocket represents a point at which minimum pedal force is communicated to stress within the draw-chain; and
wherein the second sear timing rod draws the sear latch face from the shaft notch face at the predefined point of rotation; whereby bicycle shifting occurs at instant of minimum chain stress.

11. A sprocket ratio changer of claim 6, further comprising
- a Governor means, further comprising,
  - a pedalled-sprocket ring surface,
  - a pinion with friction surface,
- a centrifugal ball governor, further comprising
  - a velocity rod holder; and
- a velocity rod;

wherein the ring surface of the pedal-driven sprocket rotationally communicates with the pinion surface whose shaft output rotates an attached governor means; and
wherein the rotational communication is converted by the centrifugal ball governor to a linear movement of the velocity rod; and
wherein pedal a linear movement of the velocity rod communicates the governor velocity to a cadence threshold apparatus.

12. A sprocket ratio changer of claim 11, further comprising;
- a cadence threshold apparatus
- a spring and latch module
- an upshift cable-core moving means;

wherein the cadence threshold apparatus receives communication from the velocity rod, and sends communication through a trigger rod to a sear rod which, upon communicated command, releases first latch of the pedal-velocity spring and latch module; and
wherein the upshift cable-core moving means is coupled to a velocity-sensitive spring and latch module.

13. A sprocket ratio changer of claim 12, further comprising a series-logic shift timing means;
- wherein the series-logic shift timing apparatus connects to the trigger rod of the cadence threshold apparatus and to the sear rod of the velocity sensitive spring and latch module.

14. A sprocket ratio changer of claim 13 wherein the series-logic shift timing means further comprises:
- a frame-sliding rod
- a toggle-cam with sliding cam face
- a toggle switch
- a rotary cam
- a cam-follower
- cam-holding spring
- a toggle return cam
- a sear delivery rod;

wherein the trigger rod from the velocity threshold means communicates through the frame-sliding rod to the toggle cam which lowers its sliding cam face into a rotary path of the pedalled sprocket face on which a toggle switch rotates; and
wherein the cam face displaces the toggle from a passive position to an active position; and
wherein the toggle switch conveys its active position to a rotational orientation of the pedalled sprocket near the end of a rider's leg stroke where a minimum level of force is transmitted from the pedal to the draw-chain; and
wherein the rotary cam is located opposite travel of the toggle at the rotary orientation and the active position of the toggle actuates the rotary cam; and
wherein the rotary cam depresses a cam follower that communicates through a second sliding rod to communicate with the sear delivery rod of the velocity spring and latch module;
whereby release of the sear occurs at the instant when the sprocket position is communicating a minimum of stress to the draw chain; and
wherein the toggle depresses the cam-holding spring as it leaves the cam location to release the first cam to its passive condition; and the toggle-return cam resets the toggle to a passive position after it has actuated the rotary cam.

15. A sprocket ratio changer of claim 6, wherein both an upshift and downshift cable core moving means communicate with the same cable core.

16. A sprocket ratio changer of claim 6, further comprising
- a distributor means, further comprising
  - a first cable input,
  - a first cable output, and
  - a second cable output;

wherein first cable input motion is relayed to a first cable output and thence to the first cable's intended derailleur apparatus; and
wherein the first derailleur exhibits resistance in accepting continued increments of cable movement beyond its receiving arm's end-travel distance; and
wherein resistance at relaying first cable output initiates alternatively communicating to a second derailleur through a second cable output.

17. A sprocket ratio changer of claim 16 wherein the distributor means further comprises:
- an outer distributor wall, further comprising
  - a first cable cover input connection
  - a second cable cover open passageway
  - a first cable cover output connection;
- a carrier box further comprising,
  - a first cable core open passageway
  - a second cable cover connection
  - a carrier arm with first cable core output connection;
- a core slider, further comprising,
  - a first cable core connection
  - a second cable core connection
  - an open tension/compression spring;

wherein the first cable cover terminates at the distributor wall, and the first core passes through the distributor wall and through the carrier box wall to become attached to the core slider; and
wherein the carrier box slides within the distributor and the carrier box transmits first cable core motion to a carrier arm with first cable core output connection; and
wherein the first cable core connects to the output connection through an open tension/compression spring; and
wherein resistance from exceeding travel limits acceptable to the rear derailleur, the core slider moves against bias of the spring to transfer movement from a first cable input to a second cable output that connects to the front derailleur whereby incremental forward and backward movements of a cable are relayed through a distribution means to a preferred derailleur apparatus until forward or backward travel limits resist further cable-motion instruction, and continued cable motion instruction is transferred to a second derailleur apparatus.

18. A sprocket ratio changer of claim 16, further comprising:
- a finger-shift cable mover;

wherein the finger shift cable mover communicates to the rear wheel derailleur and the front wheel derailleur through the distributor; and
wherein cable movement induced by the finger shift cable mover passes through the cable core collet means without resistance.

* * * * *